United States Patent [19]

Smith

[11] 4,159,119
[45] Jun. 26, 1979

[54] COMBINATION SLEIGH AND WAGON

[76] Inventor: James A. Smith, 25 N. Fifth St., Stroudsburg, Pa. 18360

[21] Appl. No.: 830,844

[22] Filed: Sep. 6, 1977

[51] Int. Cl.² .............................................. B62B 13/18
[52] U.S. Cl. ........................................................ 280/9
[58] Field of Search .................. 280/8, 9, 39, 43, 11.2, 280/19, 20; 188/19, 20

[56] References Cited

U.S. PATENT DOCUMENTS

| 2,106,530 | 1/1938 | Kelly | 280/9 |
|---|---|---|---|
| 2,106,530 | 1/1938 | Kelly | 280/9 |
| 2,743,112 | 4/1956 | Lambert | 280/9 |
| 3,429,582 | 2/1969 | Embry | 280/9 |
| 3,912,290 | 10/1975 | Rich | 280/9 |
| 4,076,266 | 2/1978 | Krausz | 280/11.2 |

Primary Examiner—Joseph F. Peters, Jr.
Assistant Examiner—Gene A. Church
Attorney, Agent, or Firm—Kirschstein, Kirschstein, Ottinger & Cobrin

[57] ABSTRACT

A combination sleigh and wagon in which, in summertime, the device serves as a wagon while in wintertime the detachable wheels are removed and the device serves as a sleigh in the snow. The central single front wheel of the vehicle is partially rotatable about an axis for steering purposes, while the runners also serve for steering in wintertime by the provision of structure to laterally incline the front portions of the two parallel runners. Thus the front portions of the two runners may be manually angularly oriented relative to the longitudinal axis of the vehicle for steering purposes, while the balance of each runner remains parallel to the longitudinal axis of the vehicle. In general, the runners are disposed along each edge of the body or platform of the device, parallel with the longitudinal axis of the device. More than two runners may be provided in some cases, as for a very wide vehicle. The vehicle also includes at least two other rotatable wheels mounted at the rear of the vehicle.

18 Claims, 9 Drawing Figures

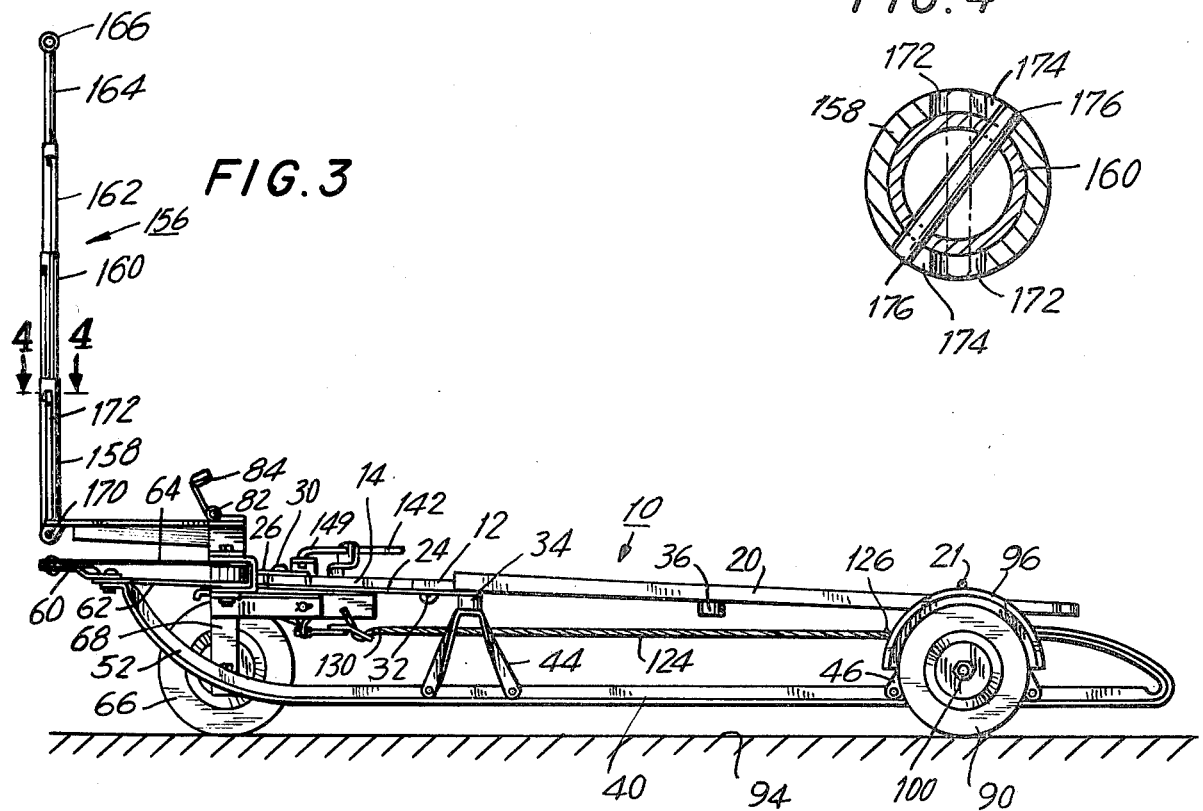
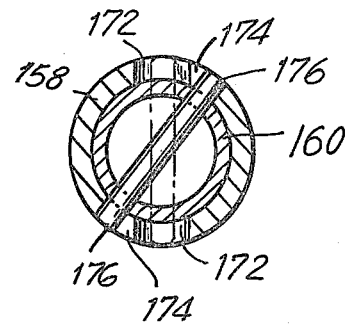
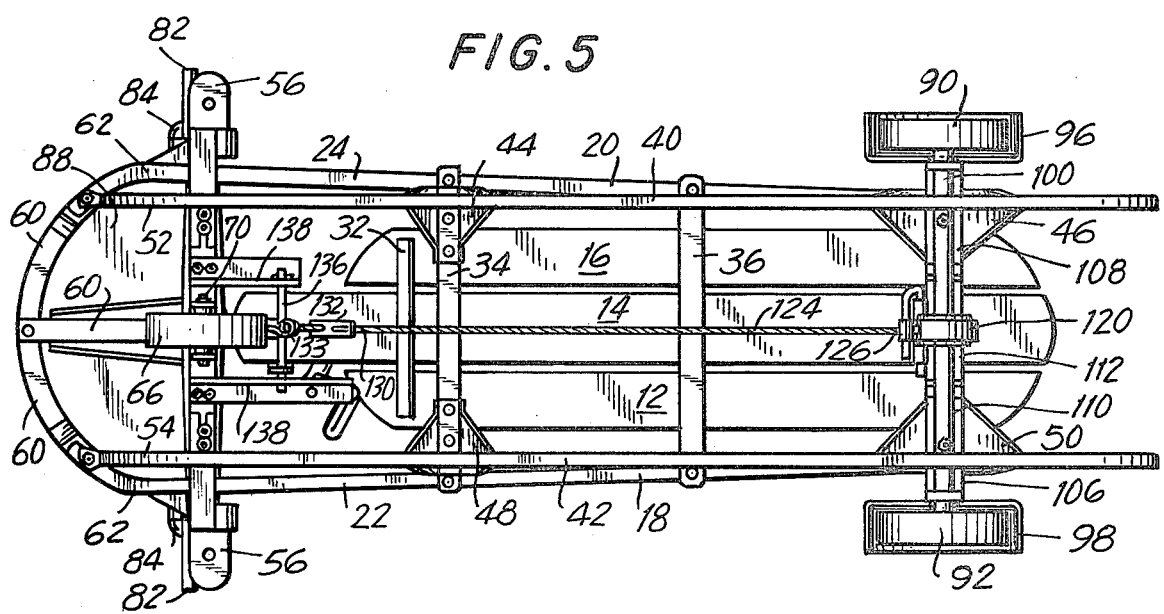

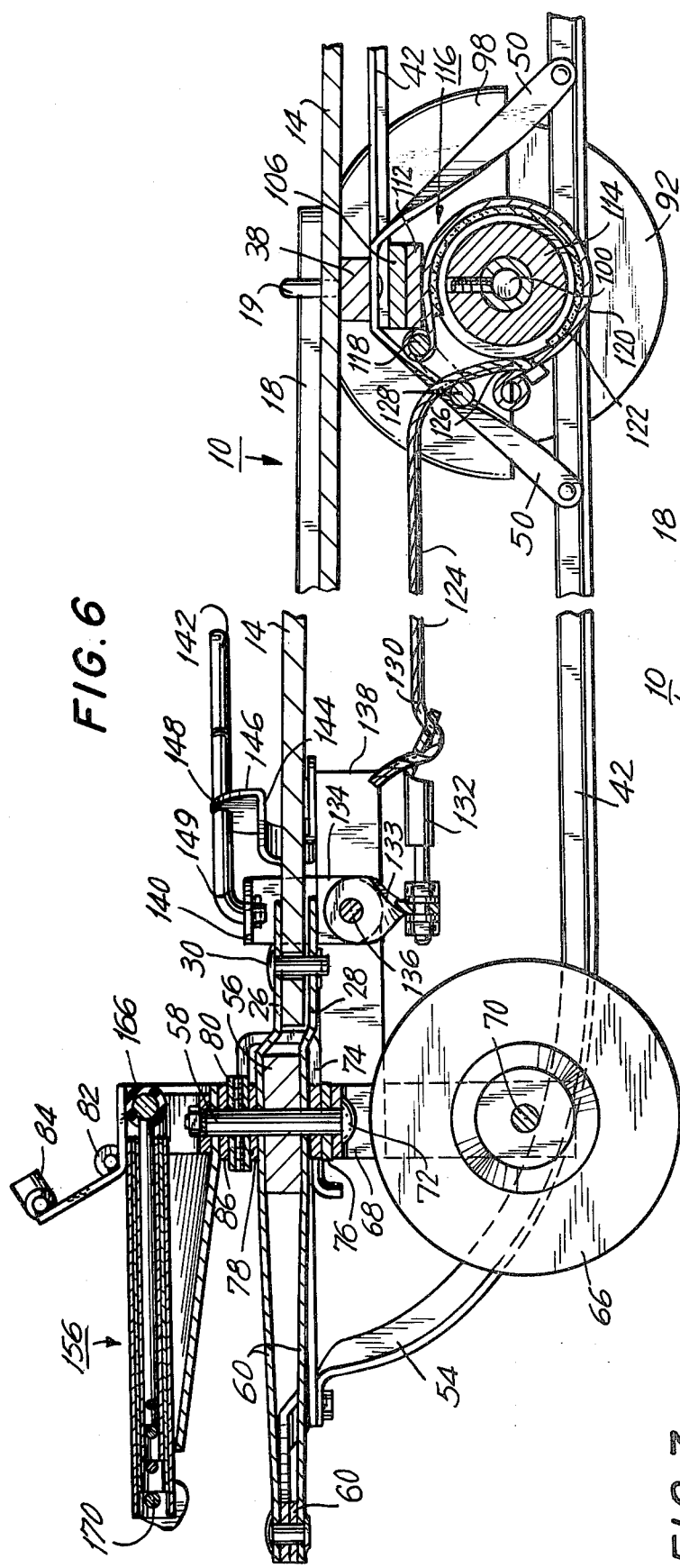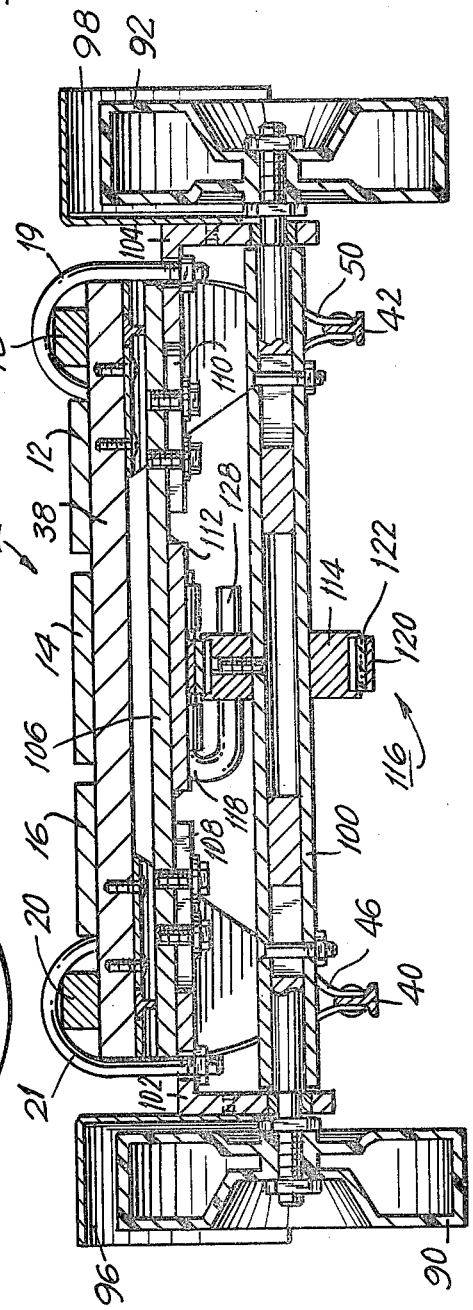

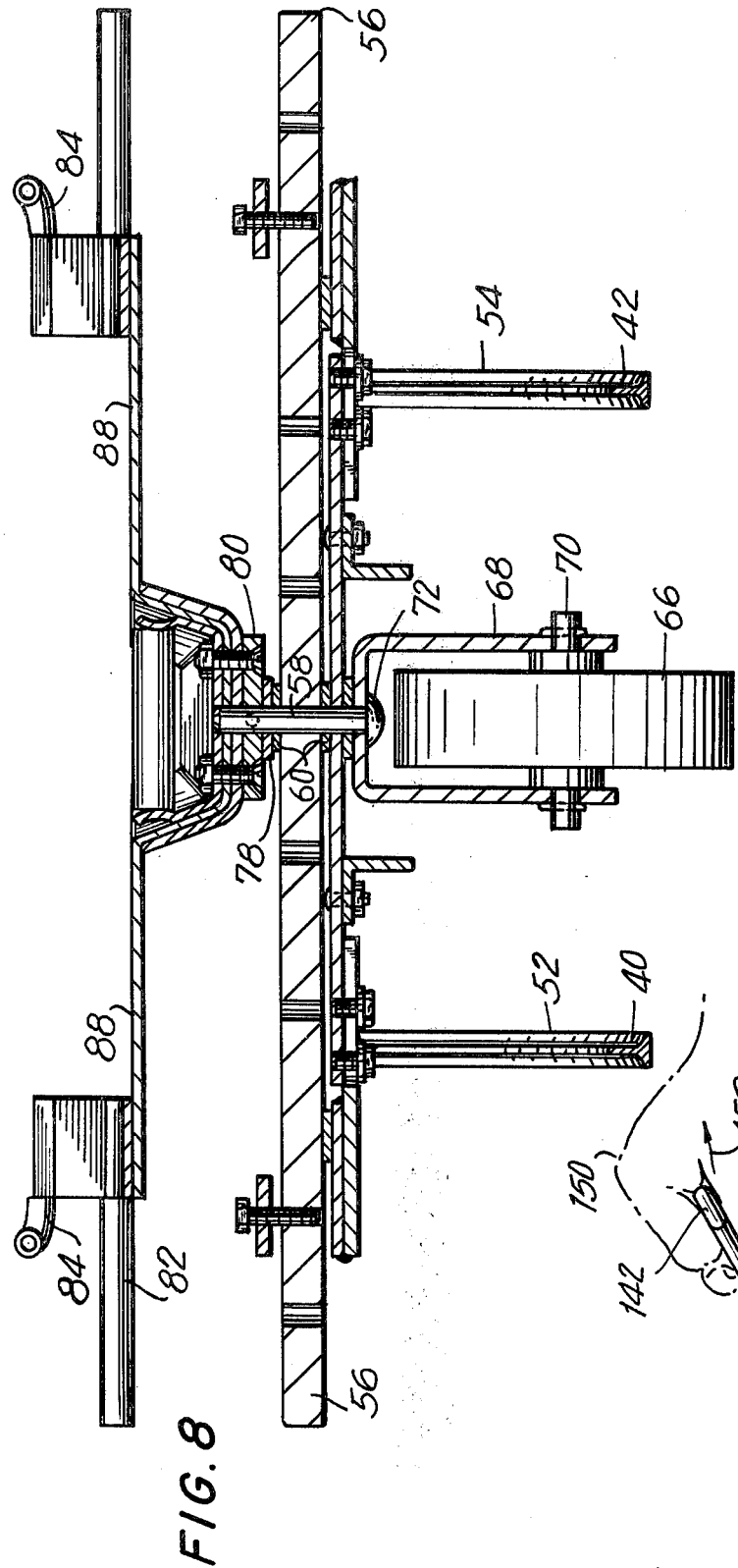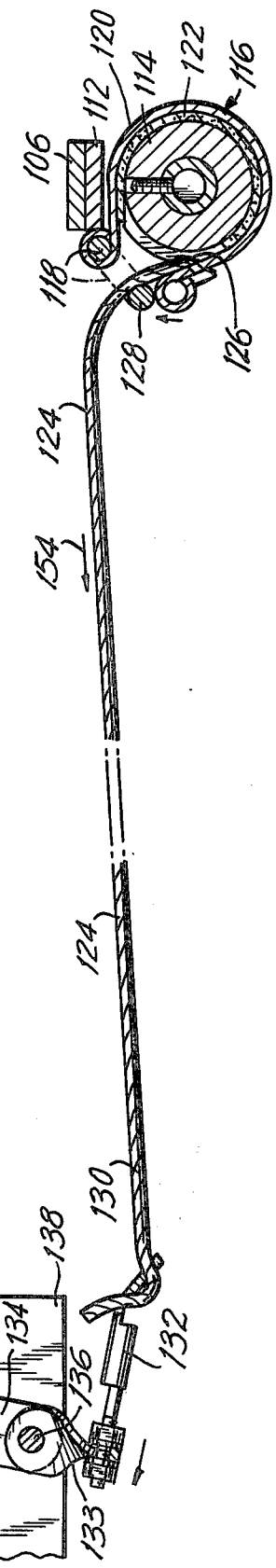

COMBINATION SLEIGH AND WAGON

BACKGROUND OF THE INVENTION

1. Field of the Invention

A combination sleigh and wagon.

2. Description of the Prior Art

Sleigh or sleds per se and wagons per se are commonly found vehicles in almost every community. Smaller units manageable by a child provide a great deal of enjoyment even to younger children. However it is commonly appreciated that sleighs provided with runners are useless unless the terrain is covered with snow, so that the sleigh can slide in the snow. Likewise, wagons are useless when the ground is covered with snow since the wheels of the wagon bog down in the snow. Thus it has been necessary in the prior art for parents to provide an active child with two vehicles, namely a sleigh for wintertime usage and play, and a wagon for summertime pleasure and activity. Thus two separate expenditures of funds are required in order to satisfy the child, and storage space must be found for one or the other of the vehicles depending on the season.

SUMMARY OF THE INVENTION

PURPOSES OF THE INVENTION

It is an object of the present invention to provide an improved combination sleigh and wagon.

Another object is to provide a vehicle of this class in which the wheels are readily detachable so that the vehicle may alternately serve as a wagon or as a sleigh or sled.

A further object is to provide a vehicle of this class having an improved brake for the rear wheels.

An additional object is to provide a vehicle of this class having an improved front handle for pulling of the vehicle either as a sleigh or as a wagon.

Still another object is to provide a vehicle of this class which is readily convertible from a sleigh to a wagon and vice versa.

An object is to provide a year round vehicle for enjoyment by children either in winter when snow covers the ground or in summer.

These and other objects and advantages of the present invention will become evident from the description which follows.

BRIEF DESCRIPTION OF THE INVENTION

In the present invention, a combination sleigh and wagon is provided which features structural elements in combination such that the vehicle may be steered either as a sleigh or as a wagon, and such that the vehicle is readily convertible from a sleigh to a wagon or vice versa due to the provision of readily detachable wheels. The vehicle includes, in general, an elongated planar platform, at least two rectilinear runners, a single central front wheel, and two spaced-apart rear wheels. Means are provided to mount a runner along each edge of the platform parallel with the longitudinal axis of the platform, so that the runners depend from one side of the platform. Means are provided to laterally incline the front portions of at least two runners relative to the longitudinal axis of the platform, so that at least the front portions of the two runners may be angularly oriented relative to the longitudinal axis of the platform and thus the vehicle may be steered as a sleigh or sled. The single front wheel is rotatable and is mounted to the platform preferably detachably, adjacent to one end of the platform, so that the single front wheel depends from the same side of the platform as the runners. The means mounting the front wheel to the platform are partially rotatable about an axis, so that the vehicle may be steered as a wagon. At least two other rotatable wheels are provided, these being the rear wheels which are mounted to the platform adjacent to the opposite end of the platform and parallel to the runners, so that the two other rotatable (rear) wheels depend from the same side of the platform as the runners.

The front wheel and the two or more rear wheels are typically detachable from the platform so that when the vehicle is to be used as a sleigh, the wheels are readily removed. At other times, when the vehicle is used as a wagon, the wheels are of such a diameter as to extend beyond and below the runners, so that the runners clear the ground, road or sidewalk in this case. Preferably, the means mounting the front wheel to the platform are partially rotatable about an axis perpendicular to the platform; and this axis typically intersects the central axis of the front wheel.

In most instances, the number of rear wheels will be two, spaced on either side of the platform at the rear end of the platform. These rear wheels will preferably be mounted on a common axle which is oriented transverse to the longitudinal axis of the platform. In this case, brake means or a suitable braking device will be mounted on the axle. It is preferred that the brake means consist of a cylindrical brake drum coaxially mounted on the axle together with an annular arcuate brake shoe which extends about a portion of the perimeter of the brake drum. Suitable means are provided to intermittently or continuously displace the brake shoe against the perimeter of the brake drum during those time periods of operation of the vehicle as a wagon when a braking action is desired or required. The brake shoe typically consists of an outer flat arcuate metallic spring, together with an inner arcuate brake lining. One end of the spring is attached to the platform, and means are provided to deform the spring towards the brake drum, so that the brake lining intermittently engages the brake drum only when a braking action is desired. The means to deform the spring toward the brake drum preferably consists of a cable which is mounted below the platform and extends towards the front end of the platform. One end of the cable is attached to the free other end of the spring, and means are provided to intermittently and manually apply tension to the cable so that the brake shoe is urged against the brake drum. The means to intermittently apply tension to the cable generally is a handle together with a pivoted lever. The lever is pivotally mounted to the platform with one end of the lever being attached to the handle. The other end of the lever is attached to the adjacent end of the cable. The one end of the lever and the handle are disposed on one (upper) side of the platform, and the other end of the lever and the cable are disposed on the other (lower) side of the platform. The handle is preferably detachably mounted on a support, which support typically is a plate mounted on the platform and having a notch to receive the shank of the handle. Typically, the lever will be oriented generally perpendicular to the platform and will have an arm at each end to which, respectively, the handle and the cable are actually attached. These arms typically are perpendicular to the lever.

In a preferred embodiment, a handle is centrally mounted to the end of the platform adjacent the front wheel. This handle is for tugging or pulling the vehicle as a wagon. The handle preferably consists of a plurality of telescoping members, together with a transverse member attached to the endmost telescoping member. This transverse member is preferably mountable in a recess at or adjacent to the surface of the platform when the handle is telescoped, so that the entire handle assemblage may be mounted and held in collapsed form on the upper surface of the platform if desired. In a preferred embodiment, the handle is provided with a longitudinal slot terminating with a lateral recess for each outer telescoping member, and an outer projection at one end of the next inner telescoping member. The projection slidably fits into the slot, with the projection slidably fitting into and being held by the recess when the handle is extended and partially rotated about its central longitudinal axis. Finally, the handle will usually be pivotally attached at its lower end to the platform so that it may be oriented at any desired angle to the vertical, depending on the height of the person pulling the vehicle.

The present combination sleigh and wagon provides several salient advantages. The device is a vehicle which is fully and readily convertible either into a sleigh or sled, or into a wagon. Thus a child may play year round with the vehicle, both in the snows of winter and at other times of the year. Thus the present vehicle takes the place of a separate sleigh and a separate wagon, in a unitary combination of elements and means. The wheels are readily attachable to and detachable from the balance of the vehicle. The vehicle may be readily fabricated in component parts and easily assembled, thus a low cost substitute for both a sleigh or sled and a wagon, which may readily be mass produced and sold at low cost, is provided. The dual functions of sleigh and wagon serve to stimulate the mind of a child playing with the vehicle. The concept of the invention may of course also be applied to larger sized vehicles for usage in commerce and hauling of goods, especially in colder climates such as those of the northern states. The configuration of the brake means and the front handle for towing or pulling the vehicle are highly unique and advantageous, providing simple yet effective means for accomplishing the desired functions.

The invention accordingly consists in the features of construction, combination of elements and arrangement of parts which will be exemplified in the device and article of manufacture hereinafter described and of which the scope of application will be indicated in the appended claims.

BRIEF DESCRIPTION OF THE DRAWINGS

In the accompanying drawings in which is shown one of the various possible embodiments of the invention:

FIG. 3 is an elevation view of the vehicle;

FIG. 4 is a sectional plan view taken substantially along the line 4—4 of FIG. 3;

FIG. 5 is a bottom plan view of the vehicle;

FIG. 6 is a sectional elevation view taken substantially along the line 6—6 of FIG. 2;

FIG. 7 is a sectional elevation view of the rear of the vehicle taken substantially along the line 7—7 of FIG. 2;

FIG. 8 is a sectional elevation view of the front of the vehicle taken substantially along the line 8—8 of FIG. 2; and FIG. 9 is a sectional elevation view showing the mode of manipulation of the brake means.

DETAILED DESCRIPTION OF THE PREFERRED EMBODIMENTS

Figure 2:
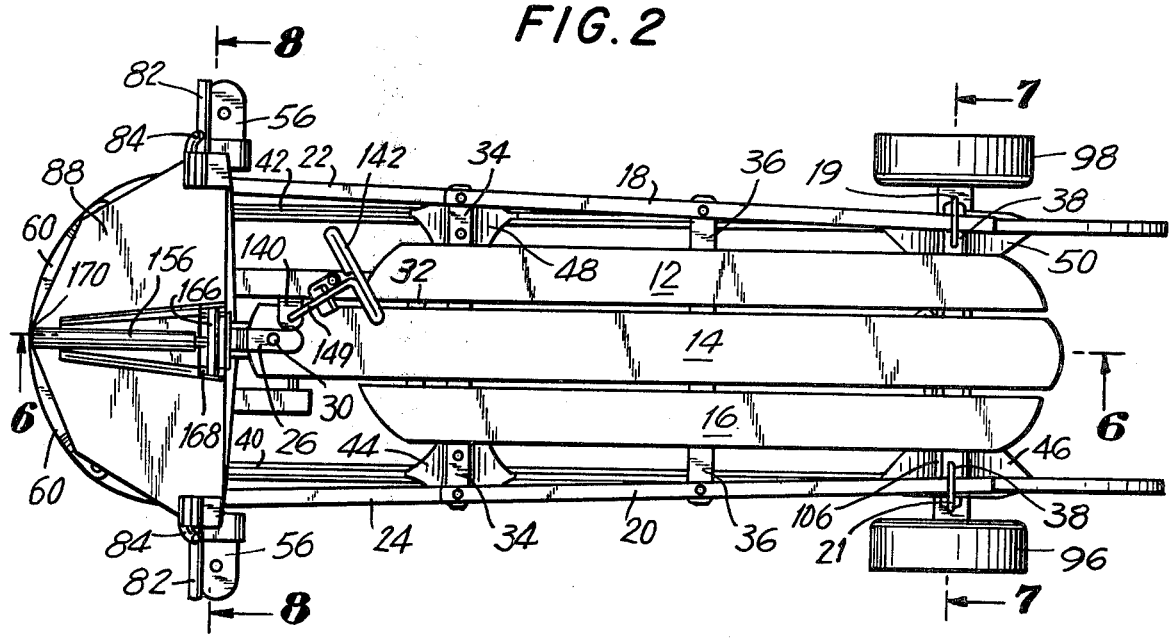
FIG. 2 is a plan view of the vehicle.

Referring now to the FIGURES, and especially to FIGS. 2 and 5, the device generally includes an elongated planar platform 10 composed of three horizontal wooden slats 12, 14 and 16 which are longitudinally oriented in parallel and form the top surface of the combination sleigh and wagon, together with lateral peripheral structural stiffening elements 18 and 20 which are wooden strips, generally square in cross-section, and 22 and 24 which are metal strips extending to the front steering assemblage of the vehicle. The central slat 14 is secured to the metallic front strips 26 and 28, which lead to the front steering section of the vehicle, by a bolt 30 (FIG. 6). A transverse front wooden strip 32 extends below and is attached to elements 12, 14 and 16 in series to hold them together and for stiffening purposes. Other transverse wooden strips 34, 36 and 38 extend below elements 12, 14 and 16 to support these elements. These strips 34, 36 and 38 are attached at their terminal extremities to members 18 and 20 by bolts. The peripheral stiffening elements 18 and 20 are secured to the lower framework by respective inverted U-bolts 19 and 21.

Figure 1:
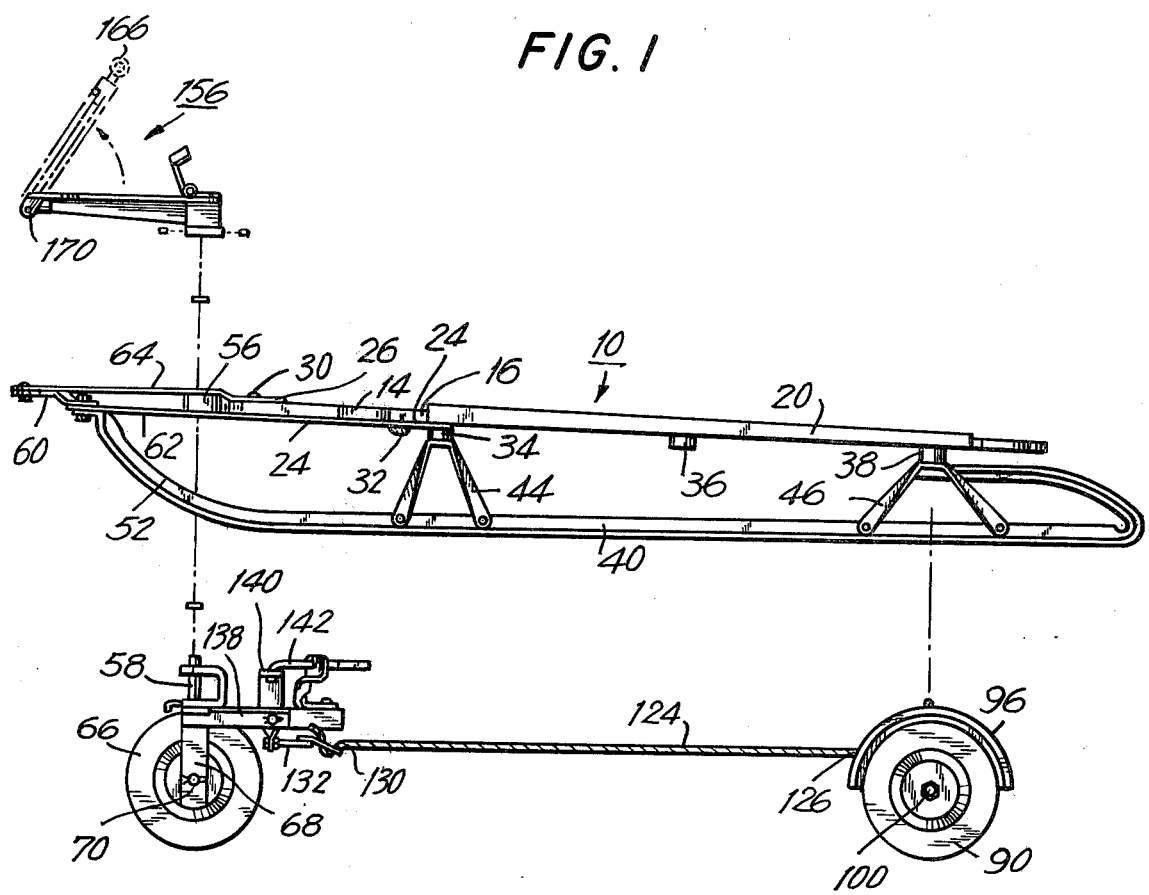
FIG. 1 is an exploded elevation view of the vehicle showing detachable elements separated from the main body of the vehicle.

The vehicle includes two rectilinear metal runners 40 and 42. These runners are mounted along each edge of the platform 10 parallel with the longitudinal axis of the platform by means consisting of metal brackets 44, 46, for runner 40, and metal brackets 48, 50 for runner 42. The brackets 44, 46, 48 and 50 are generally bifurcated members which are bolted to the runners at their lower extremities. The central upper portions of brackets 44 and 48 are bolted to the transverse member 34 and the central upper portions of brackets 46 and 50 are bolted to the transverse member 38, so that the brackets transfer the weight of e.g. a person sitting on platform 10, to the runners 40 and 42. Each runner is characterized by being a metallic strip having a flat lower surface, typically with a central longitudinal vertical extension for stiffening purposes; the configuration of the runners per se is comparable to that of known runners for sleds or sleighs. The cross-sectional configuration of the runners as described supra appears in FIGS. 7 and 8. As best seen in FIGS. 1, 3 and 6, runner 40 has an arcuate front portion 52 and runner 42 has an arcuate front portion 54; the front portions 52 and 54 of the respective runners 40 and 42 extend upwards from ground level to the front of the vehicle at the elevation of the platform 10. The front end of each portion 52 and 54 is attached to the front steering mechanism of the vehicle. Thus the runners 40 and 42 depend from the platform 10.

Means are provided to laterally incline the front portions of the runners 40 and 42 relative to the longitudinal axis of the platform 10, and especially to laterally incline the portions 52 and 54. These means include a wooden transverse horizontal cross-bar 56 near the front end of the vehicle. The cross-bar 56 is centrally pivoted on pin 58, so that when the terminal portions of the cross-bar 56 are grasped and inclined or partially rotated about an axis defined by the pin 58, e.g. one end forwards and the other end rearwards, the cross-bar 56 stresses the front ends of the runners 40 and 42 via metal central connecting framework members 60, which stresses the front portions 52, 54 of the runners 40, 42 causing them as well as frame members 62 and 64 to laterally incline. As will appear infra, such motion is precluded when the detachable wagon elements such as a front wheel 66 are attached to the device.

The central front wheel 66 is a single first rotatable wheel which is detachably mounted to the platform 10 adjacent to the front end of the platform 10 of the vehicle, so that the first wheel 66 depends from the same side of the platform 10 as the runners 40 and 42. The means mounting the first wheel 66 to the platform 10 are partially rotatable about an axis, so that the front wheel is usable for steering of the vehicle as a wagon. In other words, the means mounting the first wheel 66 to the platform 10 are generally partially rotatable about an axis perpendicular to the platform 10, so that the vehicle may be steered. This axis preferably intersects the horizontal central axis of the wheel 66 about which the wheel 66 is fully rotatable, to allow the vehicle to proceed and move as a wagon.

The front wheel 66 is thus held by the bifurcated clevis 68 on which the axle 70 of the front wheel 66 is actually mounted. The clevis 68 is held by the head 72 of pin 58, and when the detachable elements shown in FIG. 1 are attached, the pin 58 is partially rotatable so that the wheel 66 may be turned to steer the vehicle. Referring to FIG. 6, pin 58 is held to mounting bracket 74 by lower washer 76 and upper washer 78 and plate 80, so that lateral inclination of steering handles 82, 84 (FIGS. 2 and 4), rearwards or forwards, partially rotates steering member 86 (FIG. 6) so as to turn the wheel 66. The assemblage is mounted to an upper steering plate 88 (FIG. 8), to which the handles 82, 84 are actually attached. The steering plate 88 is what actually turns the pin 58 to turn wheel 66.

Referring now to the rear of the vehicle, two spaced apart rotatable rear wheels 90 and 92 are fixedly attached to the platform 10 adjacent to the rear of the vehicle. The wheels 90 and 92 depend from the same side of the platform 10 as the front wheel 66 and the runners 40 and 42. It should be noted that, in practice, the lower edges of the wheels 66, 90 and 92 extend further away from the platform 10 than the runners 40, 42 so that clearance is provided between runners 40, 42 and the ground surface 94 (FIG. 3), when the vehicle is used as a wagon. The rear wheels 90, 92 may be provided with respective upper fenders 96, 98 in practice.

The rear wheels 90, 92 are mounted on opposite ends of a rear axle 100, which common axle 100 is transverse to the longitudinal axis of the platform 10, and axle 100 in turn is mounted to the platform 10 by brackets 102 and 104 which extend to the lower rear metal strip framework member 106, which is below and parallel to member 38. Lateral horizontal plate members 108 and 110, and central plate member 112, are attached to the lower surface of member 106 for stiffening purposes in the attachment of other members to framework strip member 106.

A braking means is attached to and mounted on the rear axle 100. This braking means includes a cylindrical brake drum 114 which is coaxially mounted on the axle 100, together with an annular arcuate brake shoe 116 which is mounted on a U-shaped support 118 and extends about a portion of the perimeter of the brake drum 114. The brake shoe 116 includes an outer flat arcuate metallic spring 120 and an inner arcuate brake lining 122. One end of the spring 120 is attached to the platform 10 via support rod 118 which is attached to the lower metallic framework member 112.

Means are provided to displace the brake shoe 116 against the perimeter of the brake drum 114. Thus means including a cable 124 are provided to deform the spring 120 towards the brake drum 114, so that the brake lining 122 intermittently engages the brake drum 114 only when a braking action is desired. At such times, the cable 124, which is mounted below the platform 10 and extends towards the front of the platform 10, is placed under tension. One end 126 of the cable 124 is attached to the free end of the spring 120, and at this end 126 the cable is supported above ground by passing over the free leg 128 of U-type support 118.

Any suitable means may be provided to intermittently apply tension to the cable 124. In this embodiment of the invention, the front end 130 of the cable 124 extends to and is attached via a connector 132 to an arm 133 of a lever 134, which lever 134 is pivotally attached at pivot 136 to a metal plate 138 mounted below the platform 10. The upper end of the lever 134 is attached via an arm 140 to a handle 142 above the platform 10. It is to be noted that the pivoted lever 134 is thus pivotally mounted to the platform, with end arm 140 and handle 142 being disposed on the one (upper) side of the platform and the other end arm 133 and the cable 124 being disposed on the other (lower) side of the platform.

The handle 142 is preferably detachably mounted on a support 144 which consists of a plate mounted on the member 138 and having a vertical portion 146 with a notch 148 to receive the shank 149 of the handle. FIG. 9 shows the mode of operation of the brake means, with the hand 150 shown in phantom outline grasping the handle 142, lifting the handle 142 away from the notch 148, and pulling the handle 142 in the rearwards direction shown by arrow 152, so as to exert tension on the cable 124 by pivoting lever 134 and thereby stressing cable 124 in the direction shown by arrow 154, so that the braking action described supra takes place. When the hand 150 ceases to exert tension on cable 124 via lever 134, the natural spring force of spring element 120 moves lining element 122 away from brake drum 114, thus terminating the braking effect. At this time the handle shank is re-inserted into notch 148 for storage until braking is again desired.

It is to be noted that for maximum efficiency in operation of the lever 134, this lever is oriented substantially perpendicular to the platform 10, and the arms 133 and 140 are each perpendicular to the lever 134.

Finally, the vehicle is preferably provided with a front handle of unique configuration for manual towing of the vehicle either as a sleigh or sled, or as a wagon. This handle 156 is centrally mounted to the plate 88 at the front end of the platform 10 adjacent the first rotatable wheel 66. In this embodiment of the invention, the handle 156 is provided with four telescoping members 158, 160, 162, 164 together with a transverse member 166 which is attached to the endmost member 164. The telescoping members provide the adjustability feature of the present handle 156. Thus when the handle is telescoped or closed, the transverse member 166 is mountable in a recess 168 (FIG. 2) at or adjacent to the surface of the platform 10, in this case the recess 168 is in the cover plate 88. The handle is pivotally attached to the plate 88 at 170.

The telescoping members 158, 160 and 162 are each provided with a longitudinal slot terminating with a lateral recess, and the telescoping members 160, 162, 164 are each provided with an outer projection at one end, with the projection of an inner telescoping member slidably fitting into the slot of the next outer telescoping member. The slot 172 and recess 174 of member 158, in conjunction with the projection 176 of member 160, are shown in FIG. 4. In each instance, the projection of an inner member slidably fits into the slot of the next outer member, with the projection slidably fitting into the recess when the handle is extended and partially rotated about its central longitudinal axis. Thus the handle may be extended to full length, and partially rotated to yield a length commensurate with the number of telescoping members.

The details of bolting the various metallic members of the wagon aspect of the vehicle are also shown. This provides and facilitates the detachable nature of the wagon appurtenances (see FIG. 1). When the wagon appurtenances of the vehicle are removed, so that the vehicle may be used as a sled, ordinarily a rope would be attached to the front of the sled in order that the sled may be pulled or towed in the snow.

It thus will be seen that there is provided a combination sleigh and wagon which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A combination sleigh and wagon which comprises an elongated planar platform, at least two substantially parallel rectilinear runners, means mounting a runner along each edge of said platform parallel with the longitudinal axis of said platform, so that said runners depend from said platform, means to laterally incline the front portions of at least two runners relative to the longitudinal axis of said platform, so that at least said front portions of said at least two runners may be angularly oriented relative to the longitudinal axis of said platform, a first rotatable wheel, means mounting said first wheel to said platform centrally between said runners and along the longitudinal axis of said platform, and adjacent to one end of said platform, so that said first wheel depends from the same side of said platform as said runners, said means mounting said first wheel to said platform being partially rotatable about an axis perpendicular to said platform, said axis perpendicularly intersecting the central axis of said first wheel, at least two other rotatable wheels, and means mounting said two other rotatable wheels to said platform adjacent to the opposite end of said platform and parallel to said runners, so that said two other rotatable wheels depend from the same side of said platform as said runners.

2. The combination sleigh and wagon of claim 1 in which the first wheel and the two other rotatable wheels are detachable from the platform.

3. The combination sleigh and wagon of claim 1 in which the number of other rotatable wheels is two.

4. The combination sleigh and wagon of claim 1 in which the at least two other rotatable wheels are spaced on opposite sides of the platform and mounted on a common axle, said common axle being transverse to the longitudinal axis of the platform.

5. The combination sleigh and wagon of claim 4 in which brake means is mounted on the axle.

6. The combination sleigh and wagon of claim 5 in which the brake means is a cylindrical brake drum coaxially mounted on the axle together with an annular arcuate brake shoe, said brake shoe extending about a portion of the perimeter of said brake drum, and means to displace said brake shoe against the perimeter of said brake drum.

7. The combination sleigh and wagon of claim 6 in which the brake shoe comprises an outer flat arcuate metallic spring, together with an inner arcuate brake lining, one end of said spring being attached to the platform, together with means to deform said spring towards the brake drum, so that said brake lining intermittently engages the brake drum only when a braking acting is desired.

8. The combination sleigh and wagon of claim 7 in which the means to deform the spring towards the brake drum is a cable, said cable being mounted below the platform and extending towards the one end of the platform, one end of said cable being attached to the other end of the spring, together with means to intermittently apply tension to said cable.

9. The combination sleigh and wagon of claim 8 in which the means to intermittently apply tension to the cable is a handle, together with a pivoted lever, said pivoted lever being pivotally mounted to the platform, one end of said lever being attached to said handle, the other end of said lever being attached to the other end of the cable, said one end of said lever and said handle being disposed on one side of the platform, said other end of said lever and said cable being disposed on the other side of the platform.

10. The combination sleigh and wagon of claim 9 in which the handle is detachably mounted on a support.

11. The combination sleigh and wagon of claim 10 in which the support is a plate mounted on the platform, said plate having a notch to receive the shank of the handle.

12. The combination sleigh and wagon of claim 9 in which the lever is oriented substantially perpendicular to the platform, and the lever has a first arm at its one end to which the handle is attached and a second arm at its other end to which the cable is attached.

13. The combination sleigh and wagon of claim 12 in which the first and second arms are each perpendicular to the lever.

14. The combination sleigh and wagon of claim 1 in which a handle is centrally mounted to the end of the platform adjacent the first rotatable wheel.

15. The combination sleigh and wagon of claim 14 in which the handle consists of a plurality of telescoping members, together with a transverse member attached to the endmost telescoping member.

16. The combination sleigh and wagon of claim 15 in which the transverse member is mountable in a recess at or adjacent to the surface of the platform when the handle is telescoped.

17. The combination sleigh and wagon of claim 15 in which an outer telescoping member is provided with a longitudinal slot terminating with a lateral recess, and the next inner telescoping member is provided with an outer projecton at one end, said projection slidably fitting into said slot, with said projection slidably fitting into said recess when the handle is extended and partially rotated about its central longitudinal axis.

18. The combination sleigh and wagon of claim 14 in which the handle is pivotally attached to the platform.

* * * * *